Sept. 17, 1935.    O. M. ANDERSON ET AL    2,014,712
VEGETABLE CUTTING DEVICE
Filed Sept. 16, 1932    2 Sheets-Sheet 2
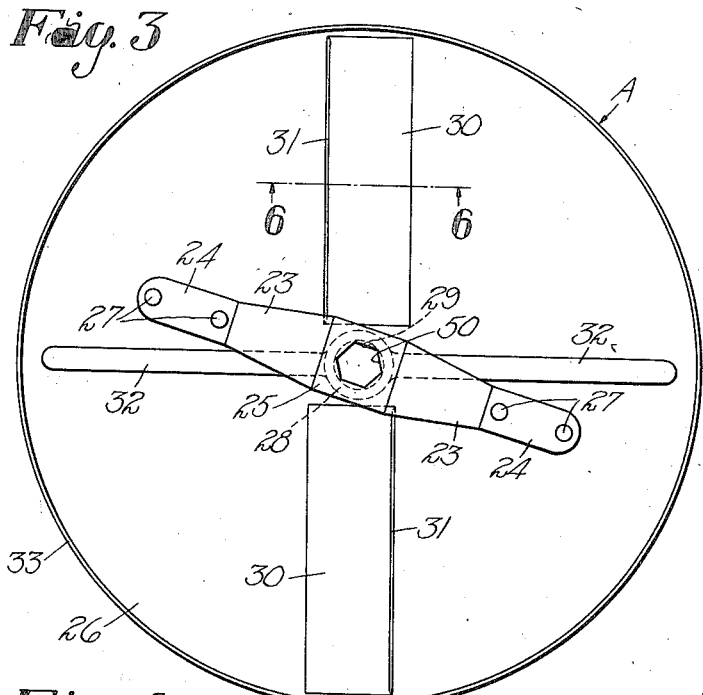
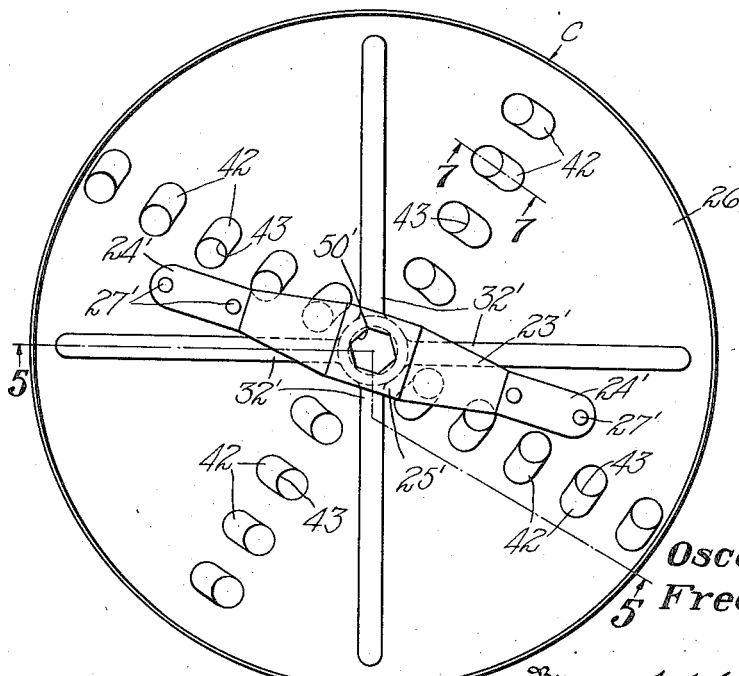
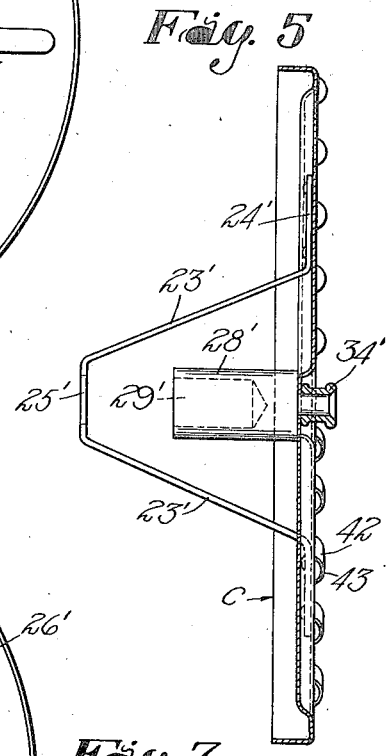
Inventor
Oscar M. Anderson
Fred W. Juengst Patented Sept. 17, 1935

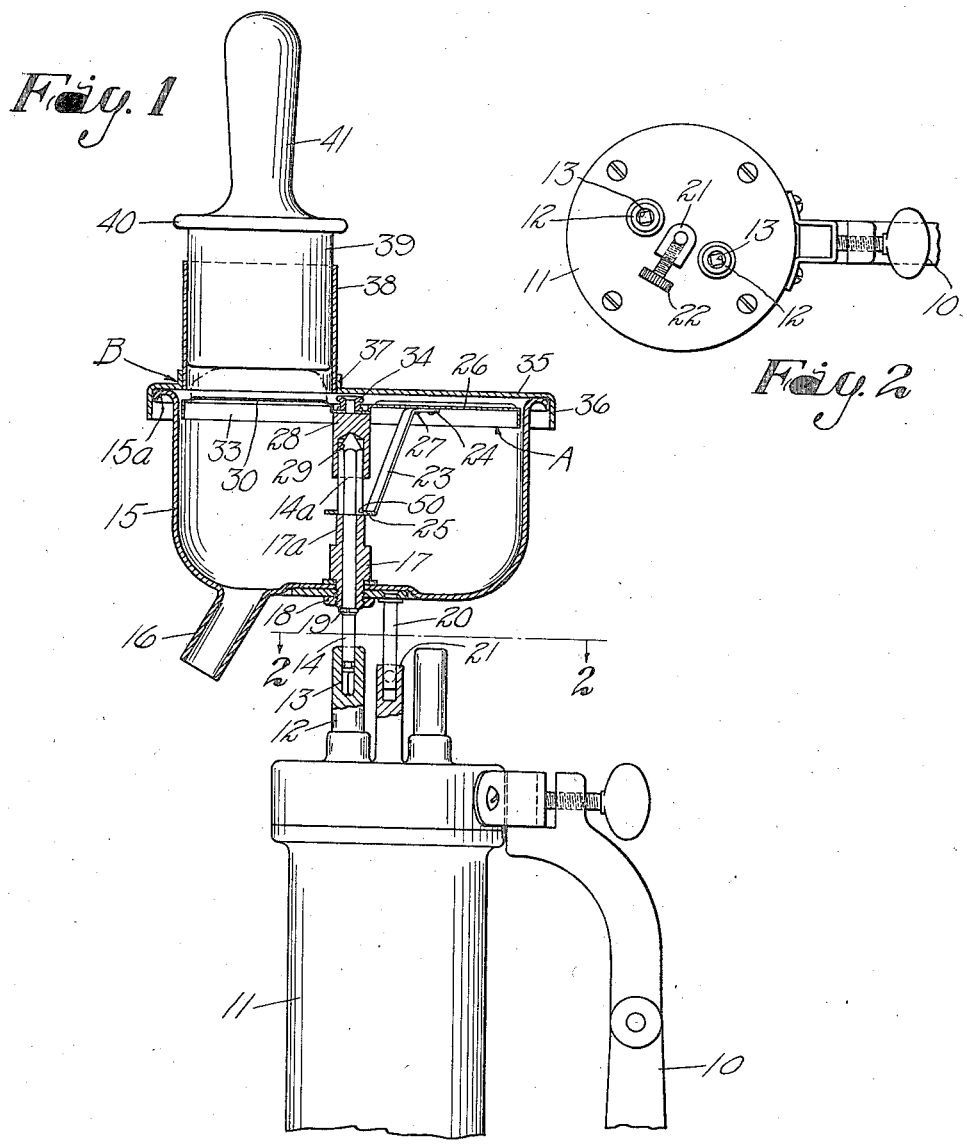

2,014,712

UNITED STATES PATENT OFFICE 2,014,712

VEGETABLE CUTTING DEVICE

Oscar M. Anderson and Fred W. Juengst, New Britain, Conn., assignors to Landers, Frary & Clark, New Britain, Conn., a corporation of Connecticut Application September 16, 1932, Serial No. 633,430

3 Claims. (Cl. 146—125)

The present invention relates to slicing and grating apparatus, and more particularly to an apparatus of this kind which may be used in connection with a power driven device somewhat similar to a well known type of fruit juice extractor now on the market. This referred to juice extractor includes an electric motor having a drive shaft, an extractor member detachably mounted on the drive shaft and driven thereby, and a bowl surrounding the extractor member.

It is an object of the present invention to provide an improved slicing assembly and grater assembly either of which may be mounted upon the drive shaft of the motor in place of the juice extractor member and by means of which foodstuffs, such as potatoes, apples, et cetera, may be cut up, or sliced, or grated.

It is another object of the present invention to provide an improved assembly of this kind which may be substituted for the juice extractor member quickly and with little effort and skill.

Still another object of the present invention is to provide in a device of this kind an improved hopper assembly which cooperates with the slicing and grating assemblies.

A further object of the present invention is to provide a device of this character which comprises few parts, is simple in construction, relatively cheap to manufacture, and admits of ready assembly and dis-assembly so that the same may be easily and quickly cleaned.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein is shown one embodiment which the present invention may take, Fig. 1 is a fragmentary side view, partly in elevation and partly in section, of our improved device;

Fig. 2 is a section on the line 2—2 of Fig. 1 and looking in the direction of the arrows;

Fig. 3 is a bottom plan view of the slicing assembly;

Fig. 4 is a bottom plan view of the greater assembly;

Fig. 5 is a section on the line 5—5 of Fig. 4 and looking in the direction of the arrows;

Fig. 6 is a section on the line 6—6 of Fig. 3 and looking in the direction of the arrows; and Fig. 7 is a section on line 7—7 of Fig. 4, and looking in the direction of the arrows.

Referring more particularly to the drawings, 10 designates a standard which may be supported upon a suitable base, not shown, and which has mounted thereon a motor casing 11 housing an electric motor, not shown. The electric motor is provided with a drive shaft 12 having a square shaped recess 13 in its upper free end into which detachably fits a similarly shaped portion of a shaft 14 whereby a driving connection is established between the shafts 12 and 14. Mounted upon and surrounding the shaft 14 is a bowl 15 having a flange 15a surrounding its open end and a delivery spout 16, generally used on fruit juice extractors. The bottom of the bowl 15 is provided with an opening through which the shaft 14 extends. Surrounding the intermediate portion of the shaft 14 and disposed within the bowl 15 is a bearing sleeve 17 having an intermediate enlarged portion and a lower externally screw threaded reduced portion which extends through and below the opening in the bottom of the bowl 15. A shoulder is thus provided on the sleeve 17, and a washer is disposed between this shoulder and the bottom of the bowl. A nut 18 is threaded upon the lower reduced end of the sleeve 17 to cooperate with the shoulder on the sleeve to maintain the sleeve in fixed position on the shaft 14 and in the bowl. The shaft 14 is provided with a collar 19 which abuts the lower reduced end of the sleeve 17 to prevent upward movement of the shaft 14. The sleeve 17 is also provided with an upper portion 17a of reduced diameter. The upper portion 14a of the shaft 14 is larger in diameter than the portion of the shaft within the sleeve 17 so as to provide a shoulder on the shaft 14 which rests upon the upper end of the sleeve 17 to prevent the shaft 14 from falling or moving downwardly. The enlarged upper portion of the shaft 14 is polygonal, for example, hexagonal, in shape, for a purpose to be described later.

The bowl 15 is also provided with a supporting leg 20 secured to the bottom of the bowl and extending downwardly therefrom to have its lower free end received in an upwardly opening socket in a post 21 carried by the cover of the motor casing 11. The post 21 is provided in one wall thereof with a screw threaded aperture, the inner end of which opens into the socket of the post. A binding screw 22 is mounted in this aperture in the post 21 and is adapted to have its inner end engage the leg 20 to lock the bowl against displacement.

A slicing assembly is generally designated A and comprises a yoke of substantially V-shape having a pair of upwardly diverging arms 23 each of which is provided at its upper free end with an outwardly extending attaching ear or lug 24 having suitable openings therein. The arms 23 are joined together at their lower ends by a substantially horizontally disposed connecting plate or bridge 25 which is provided with a centrally disposed polygonal shaped opening 50 adapted to be received by the upper correspondingly shaped portion 14a of the shaft 14 to establish a detachable driving connection between the shaft 14 and the yoke.

A cutter in the form of a substantially flat metal disk 26 is secured to the yoke by means of rivets 27 or the like which pass through aligned openings in the ears 24 and in the disk 26. The disk 26 is provided with a centrally located depending boss 28 having a socket 29 therein the side wall of which is round and the bottom of which is pyramid shaped to receive the upper correspondingly shaped end of the shaft 14. This boss 28 acts as a bearing for the upper end of the shaft 14. The diameter of the portion 14a of the shaft 14 and the diameter of the opening in the bridge 25 are each less than that of the portion 17a of the sleeve 17 so that the bridge 25 rests upon the upper end of the portion 17a of the sleeve 17. The depth of the socket 29 is such that the extreme upper end of the shaft 14 engages the bottom of the socket when the bridge 25 rests upon the portion 17a of the sleeve 17.

As shown in Fig. 3, the disk 26 is provided with a pair of diametrically opposed cutter blades each of which is formed by punching up a portion 30 of the metal of the disk which portion extends radially outward from the boss 28. Each punched up portion 30 is severed from the remaining portion of the disk along one radial edge to provide a cutting edge 31 which faces in the direction of rotation of the disk 26. While two blades 30 are shown, any desirable number may be provided.

The disk 26 is further provided with a pair of diametrically opposed ribs 32 extending radially outward from the boss 28 and disposed intermediate of the blades 30. It will be noted that the yoke has its ears 24 secured to the disk 26 at opposite sides of, and adjacent to, the ribs 32 so that the driving strains conveyed to the disk 26 from the shaft 14 through the yoke are imparted to the disk close to, and in a direction towards, the ribs 32 so that said strains are absorbed by the ribs and thus distortion of the disk is prevented. These ribs also strengthen the disk and reenforce it against the cutting strains transferred to it through the cutting blades. A peripheral depending flange or skirt 33 is provided on the disk 26. It will be noted that the overall diameter of the disk and flange is less than the inside diameter of the bowl 15 so that, when the disk 26 is disposed within the bowl, sufficient clearance is provided between the disk and the sides of the bowl. The disk 26 is also provided with a knob or handle 34 by means of which the assembly A may be placed upon, and removed from, the shaft 14.

A hopper assembly, generally designated B, is adapted to be mounted upon the open end of the bowl 15 and to cooperate with the slicing assembly A to slice the foodstuff. This hopper assembly B includes a cover plate 35 of substantially the same diameter as the flange 15a of the bowl 15. The cover plate 35 is provided with a peripheral downwardly extending flange 36 which is adapted to snugly fit over, and frictionally engage, the flange 15a when the cover plate 35 is placed upon the bowl 15 to prevent relative movement between the bowl and hopper assembly B.

The plate 35 to one side of the center thereof is provided with a circular opening and an upstanding annular flange 37 surrounding said opening. Disposed in, and corresponding in shape to, this opening is a hopper 38 the lower end of which is secured to the inside wall of the flange 37 by means of solder or the like. It will be observed from Fig. 1 that the cover plate 35 and the lower end of the hopper 38, when in position upon the bowl 15, are spaced slightly above the cutting edges 31 of the blades 30 so that the foodstuff in the hopper may be sliced or cut by the rotating blades 30. The side wall of the hopper 38 opposed to the cutting edges 31 of the blades will cooperate with the blades in slicing the foodstuffs, that is, the foodstuffs will engage against and be held by said wall of the hopper while the blades cut or slice it.

The hopper is adapted to receive through its upper open end a ram or follower 39 by means of which the foodstuff is held down against the disk 26. A collar 40 is provided on the ram 39 and is adapted to engage the upper edge of the hopper to limit the downward movement of the ram to prevent the same from coming into contact with the cutters when there is no foodstuff in the hopper. A handle 41 is provided on the ram by means of which the ram may be manipulated.

In Figs. 4, 5, and 7 is shown a greater assembly, generally designated C, which may be used in lieu of the slicing assembly A. With a few hereinafter noted exceptions, the grater assembly C is the same as the slicing assembly A and corresponding parts of the assembly C have been marked with the same reference characters, primed. The cutter blades of the grater assembly C are different from the blades 30 of the slicing assembly A and comprise four radially extending rows of cutter blades each of which is formed by punching up a portion 42 of the disk 26'. These punched up portions are arcuate in cross section, and are relatively narrow and have their leading edges severed from the disk 26' to provide grating edges 43. It will be noted that the grater blades of each row are staggered with respect to the blades of the two adjacent rows so that the entire under surface of the foodstuff will be uniformly grated off. It will be seen from Fig. 4 that two diametrically opposed rows of blades 42 are provided with five spaced apart blades which extend from a point closely adjacent to the center of the disk 26' to a point closely adjacent to the periphery of the disk 26' while the other pair of diametrically opposed rows of blades contain four blades 42, the end ones of which are spaced from the center and periphery of the disk 26' respectively. This arrangement insures an entire and even grating of the foodstuff. It will also be observed that there are four radially extending ribs 32' on the disk 26' one of which is disposed between each adjacent pair of rows of blades and at substantially ninety degrees apart. As in the case of the slicing assembly A, the ears 24' of the yoke are secured to the disk 26' adjacent to, and on opposite sides of, a pair of the ribs 32' which are diametrically opposed to one another.

The assemblies A and C are adapted to be interchangeably received upon the upper end of the shaft 14, and a variety of said assemblies may be provided to slice thinner or thicker slices or to grate finer or coarser.

In the use of the device, assuming that the leg 20 of the bowl 15 is positioned in the socket in the post 21 and that the shaft 14 is disposed within the socket 13 in the drive shaft 12, one of the assemblies, for example, the assembly A, is placed upon the shaft 14 the opening 50 in the bridge 25 being threaded over the upper portion of the shaft. The assembly A is then disposed within the bowl 15, and the hopper assembly B is thus brought into position by snapping the flange 36 of the cover 35 over the flange 15a of the bowl 15. A potato or other foodstuff is then placed in the hopper 38 and the ram 39 is then inserted into the hopper and pressed upon to maintain the potato in the path of rotation of the blades 30 of the disk 26. The electric motor is then started up and the disk 26 and blades 30 rotated so that the potato is sliced up as desired, the slices falling into the bowl through the openings provided between the cutting edge 31 of the blades 30 and the adjacent edge of the disk 26.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. In an apparatus of the kind described, a motor casing, an electric motor in said casing and having an upwardly extending drive shaft, a bowl mounted on said casing, a shaft carried by said bowl and having a detachable driving connection with said drive shaft, detachable means on said casing and bowl for attaching said bowl to the motor casing against rotation with respect thereto, a horizontally disposed cutting disk detachably mounted upon the upper end of said bowl carried shaft and adapted to be driven thereby, and a cover having an opening and positioned upon the open mouth of the bowl.

2. In an apparatus of the kind described, a motor casing, an electric motor in said casing and having an upwardly extending drive shaft, a bowl mounted on said casing, detachable means on said casing and bowl for attaching said bowl to said casing against rotation with respect thereto, a shaft carried by said bowl and having a detachable driving connection with said drive shaft, said bowl carried shaft having an upper portion polygonal in cross section, a rotating cutter disk adapted to fit within the upper end of said bowl, an inverted socket on the underside of said cutter disk adapted to receive the upper end of said bowl carried shaft, and a yoke secured to the underside of said disk and provided with an opening below said socket, said opening being polygonal in form to provide a driving connection between said bowl carried shaft and said yoke.

3. In an apparatus of the kind described, a motor casing, an electric motor in said casing having an upwardly extending drive shaft, a bowl, means on said casing and said bowl for detachably attaching said bowl to said casing against rotation with respect thereto, a shaft carried by said bowl and having a detachable driving connection with said drive shaft, said bowl carried shaft having a radial shoulder and an enlarged upper end of polygonal cross section, a rotating cutter disk provided with radial ribs adapted to fit within the upper end of said bowl, an inverted socket on the underside of said disk adapted to receive the upper end of said bowl carried shaft, and a yoke secured to the underside of said disk adjacent to said ribs and provided with an opening of polygonal form to provide a driving connection between said bowl carried shaft and said yoke whereby driving strains set up in said disk by said yoke will be absorbed by said ribs and said cutter disk may be readily removed from said bowl carried shaft by a relatively longitudinal sliding movement thereof.

OSCAR M. ANDERSON.
FRED W. JUENGST.